US006999962B2

(12) United States Patent
Julliard et al.

(10) Patent No.: US 6,999,962 B2
(45) Date of Patent: Feb. 14, 2006

(54) SHARED DOCUMENT REPOSITORY WITH COUPLED RECOMMENDER SYSTEM

(75) Inventors: Laurent Julliard, Biviers (FR); Jean-Luc Meunier, Saint Nazaire les Eymes (FR); Scott D Weber, Canandaigua, NY (US); Manfred Dardenne, Grenoble (FR)

(73) Assignee: Xerox Corporation, Stamford, CT (US)

( * ) Notice: Subject to any disclaimer, the term of this patent is extended or adjusted under 35 U.S.C. 154(b) by 455 days.

(21) Appl. No.: 10/217,025

(22) Filed: Aug. 13, 2002

(65) Prior Publication Data
US 2004/0034631 A1 Feb. 19, 2004

(51) Int. Cl.
G06F 17/30 (2006.01)
(52) U.S. Cl. .............................. 707/10; 707/3; 707/707; 707/104.1; 709/203; 709/219
(58) Field of Classification Search ................ 707/3–7, 707/9, 10, 102, 104.1; 709/203, 219
See application file for complete search history.

(56) References Cited

U.S. PATENT DOCUMENTS

| 5,930,801 | A | 7/1999 | Falkenhainer et al. ...... 707/707 |
| 6,321,179 | B1 | 11/2001 | Glance et al. ............... 702/702 |
| 6,327,590 | B1 | 12/2001 | Chidlovskii et al. ........ 707/707 |
| 6,389,372 | B1 | 5/2002 | Glance et al. ............... 702/705 |
| 6,430,558 | B1 * | 8/2002 | Delano .......................... 707/5 |
| 6,493,702 | B1 * | 12/2002 | Adar et al. ..................... 707/3 |
| 6,567,797 | B1 * | 5/2003 | Schuetze et al. ................ 707/2 |
| 2002/0016786 | A1 * | 2/2002 | Pitkow et al. .................. 707/3 |
| 2002/0062358 | A1 * | 5/2002 | Kori ............................. 709/219 |
| 2002/0138582 | A1 * | 9/2002 | Chandra et al. ............ 709/206 |
| 2003/0033287 | A1 * | 2/2003 | Shanahan et al. .............. 707/3 |

OTHER PUBLICATIONS

U.S. Appl. No. 09/596,070, entitled "Recommender System And Method For Generating Implicit Ratings Based On User Interactions With Handheld Devices".
U.S. Appl. No. 09/465,561, entitled "Method For Monitoring And Encouraging Community Activity In A Networked Environment".
U.S. Appl. No. 09/305,845, entitled "System For Providing Document Change Information For A Community Of Users".
U.S. Appl. No. 09/746,917, entitled "Recommender System And Method."
U.S. Appl. No. 10/046,481, entitled "Method and Apparatus for Collaborative Document Versioning of Networked Documents".
Alexa Internet, "Alexa What's Related for Netscape Navigator", available on the Internet Apr. 2001 at http://www.alexa.com/prod_serv/netscape.html.
Alexa Internet, "Alexa Related Links for Microsoft IE", available on the Internet Apr. 2001 at http://www.alexa.com/prod_serv/msie.html.
N. Glance, D. Arregui, M. Dardenne "Knowledge Pump: Supporting the Flow and Use of Knowledge," U. Borghoff, R. Pareschi (eds), Information Technology for Knowledge Management, Springer Verlag, Berlin, 1998.

(Continued)

*Primary Examiner*—Leslie Wong
(74) *Attorney, Agent, or Firm*—Oliff & Berridge, PLC (57) ABSTRACT

A web-based shared document repository includes recommender system functions to allow users of the repository to input reviews of documents contained in the repository and to read inputted reviews. The recommender system functions appear as a seamless integration in the document repository by loosely coupling the shared document repository to a web-based recommender system.

17 Claims, 5 Drawing Sheets

OTHER PUBLICATIONS

N. Glance, D. Arregui, M. Dardenne "Making Recommender Systems Work for Organizations", Proceedings of PAAM'99, 1999.

N. Glance, JL. Meunier, P. Bernard, D. Arregui, "Collaborative Document Monitoring", in Proceedings of Group 2001, Boulder, Co., U.S.A., Sept. 30-Oct. 3, 2001.

A. Grasso, JL. Meunier, C. Thompson "Augmenting Recommender Systems by Embedding Interfaces into Office Practices" Proceedings of HICCS'00, 2000.

Hardin, G., "The tragedy of the Commons", Science, 162, pp. 1243-1248, 1968.

Ginsburg Mark, Kambil Ajit, "Annotate: A Web-based Knowledge Management Support System for Document Collections", Proceedings of HICSS-32, 1999.

DocuShare 2.1 Quick Reference, 2000.

Using Xerox DocuShare 2.2, 2000 (see in particular Section 13, "PaperPort Link to DocuShare").

* cited by examiner

SHARED DOCUMENT REPOSITORY WITH COUPLED RECOMMENDER SYSTEM

BACKGROUND OF INVENTION

The present invention relates to the field of information sharing, and in particular to the field of web-based shared document repositories and document recommender systems.

Web-based shared documents repositories support cooperation of users by allowing them to efficiently share objects, generally documents, but also a calendar, a bulletin board or the like, to have threaded conversation, to set access rights, to organize the information into workspaces, or folders, but they can also contribute to user information overflow.

An example of a shared document repository includes DocuShare® developed by Xerox Corporation. DocuShare® is a web-based document management system that allows users to store, access, and share information in a collaborative work environment with access control. In addition, DocuShare® allows any user on any system to post and retrieve information in any format such as text, scanned images, video and sound files using an Internet browser. Such shared document repositories allow information to be shared in a manner that is as simple as having the information available on the user's own local hard disk, whereas in reality the information is centrally stored.

More specifically, DocuShare® provides in a repository a list of folders and document objects available, together with metadata such as date and size. Document objects that are added to the repository are indexed to allow rapid retrieval using a search engine and entering key words. Access to the repository is controlled by defining user permissions to the repository itself or to a document or sets of documents in the repository. Typically, the documents (i.e., document objects) contained within a shared repository are identified using a URL (Uniform Resource Locator). The user interface is thus a series of HTML (HyperText Markup Language) pages or the like. This allows the document repository to be queried using a standard web browser by simply selecting a hyperlink to obtain the desired document.

In contrast, recommender systems provide personalized recommendations that take into account similarities between people based on their user profiles. An example of a recommender system is the Alexa toolbar available on the Internet at www.alexa.com. The toolbar provides a list of recommended web pages worth viewing based on some predetermined filtering criteria. Such a recommender system provides an intelligent agent that provides a way to filter items by personalized measures of quality. Recommender systems learn their users' preferences and recommend items to users by first matching users to each other by way of user profiles.

Another known recommender system, developed by Xerox Corporation, is called Knowledge Pump™. Knowledge Pump provides users with personalized recommendations of documents. When users sign up, they join communities of people with similar interests. Profiler agents track and map each user's interests, learning more about the person each time Knowledge Pump is used. A recommender agent finds matches between new items and user preferences, automatically sending relevant and high quality information to people as it is found. One objective of Knowledge Pump is to help communities, defined by their common interests and practices, to more effectively and more efficiently share knowledge, be it in the form of must-read documents or new ways to work.

A principle element of the Knowledge Pump is the recommendation functionality that is based on community-centered collaborative filtering which filters both by content and by taste (i.e., user preference). Knowledge Pump handles content filtering by relying on user recommendations to classify items into pre-defined communities. Social filtering, matching items to people by first matching people to each other, is accomplished using statistical algorithms and profiles of a collection of users. Further details of Knowledge Pump is disclosed in the article entitled "Making Recommender Systems Work for Organizations" by Natalie S. Glance, Damián Arregui and Manfred Dardenne, Proceedings of PAAM, 1999.

Notwithstanding the existence of both shared document repositories and recommender systems, there continues to exist the need for an improved, integrated system that permits documents forming part of a shared document repository to be simultaneously added and reviewed. Advantageously, retrieval of information in a large shared repository would provide in addition to document metadata but document recommendations from users of the system.

SUMMARY OF INVENTION

In accordance with the invention there is provided a coupled web-based shared document repository and web-based recommender system. Advantageously, the coupled shared document repository and recommender system increase the reliability of documents available in a shared document repository.

In accordance with one aspect of the invention, a user may recommend a document directly from a shared document repository. That is, a user may review a document available in a list of documents available in a shared repository and provide feedback on the document. The user feedback provides other users with a personalized measure of quality for those documents in the shared document repository. This enables a reduced effort on the part of the user to supply and maintain a recommender system with useful feedback information because recommendations can be made while simultaneously storing the document in the shared document repository.

In accordance with another aspect of the invention, there is provided a system that includes a shared document repository, a recommender system, and a client computer coupled by a network. The shared document repository provides shared access to document objects stored therein. The recommender system provides user evaluations and recommendations for identified document objects. The client computer couples functions of the shared document repository and the recommender system. In addition, the client computer queries data from the shared document repository and the recommender system. The data received from the shared document repository includes undefined elements. At least one undefined element is resolved through a link that references a function at the recommender system. The link includes parameter data that is specified with metadata of document content provided by the shared document repository. Also the client computer merges the data queried from the shared document repository and the recommender system to define a user interface with objects that represent a list of content in the shared document repository and recommendations associated with the content from the recommender system.

In accordance with yet another aspect of the invention, there is provided a method for integrating over a network functions of a recommender system into a shared document repository, the shared document repository allowing users to share documents using a browser that operates as part of a user interface of a client computer. The method includes: querying the shared document repository with the browser for displaying contents of a document collection; receiving data from the shared document repository concerning the contents of the document collection together with a plurality of hyperlinks; at least a first of the hyperlinks activating a function in the recommender system and a second of the hyperlinks activating a function in the shared document repository; displaying in the browser the contents of the document collection and the one or more icons related to each document in the document collection; receiving input indicating selection of one of the one or more icons; directing the browser to a link associated with the selected icon; the link including parameter data that is specified using metadata of document content provided by the shared document repository; activating a function of the recommender system identified by the hyperlink; the function being activated at the recommender system with the parameter data; and displaying in the browser resource provided by the activated function.

In accordance with a further aspect of the invention, there is provided a method for dynamically coalescing at a client computer, functions of a recommender system with documents stored in a shared document repository. The method includes: querying with the client computer the shared document repository for a list of content in a folder of the shared document repository; receiving at the client computer from the shared document repository the list of the content in the folder of the shared document repository with at least some of the list of the content having undefined elements; resolving at the client computer the undefined elements by querying a function of the recommender system with parameter data associated with the list of content in the folder of the shared document repository; the function being identified by the shared document repository and the parameter data being provided by the shared document repository; merging at the client computer results received from the recommender system and the shared document repository in a user interface of the client computer; the merged results providing the list of content in the folder of the shared document repository with recommendations associated with the content received from the recommender system.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. General Operating Environment

Figure 1:
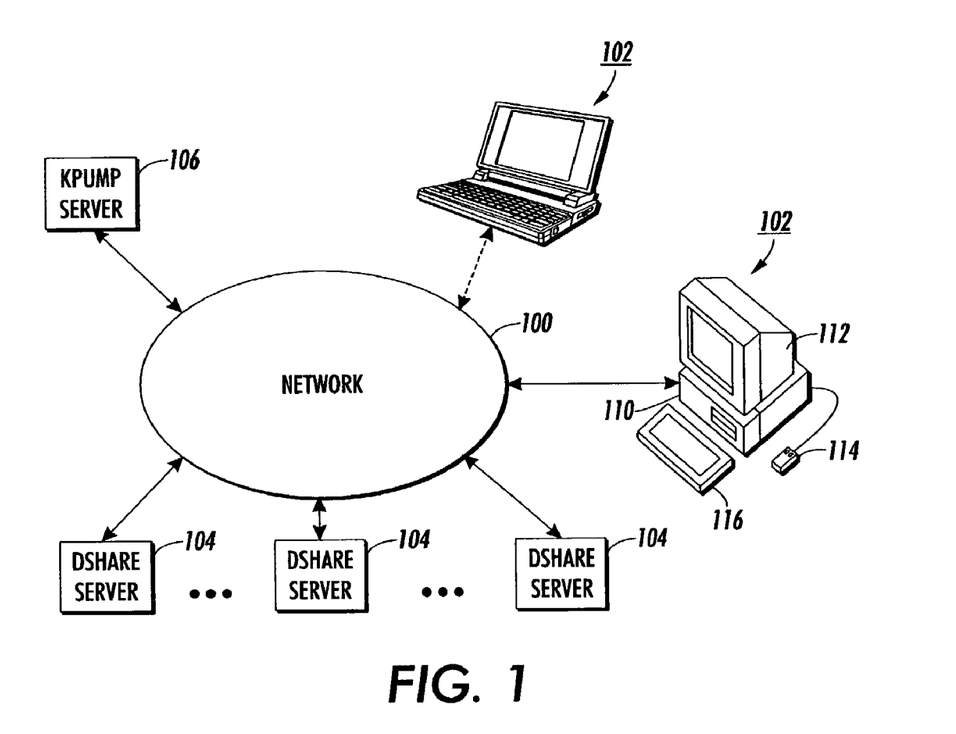
FIG. 1 illustrates an operating environment for the present invention.

FIG. 1 illustrates an operating environment for performing the present invention. The operating environment includes a network 100 In the operating environment illustrated in FIG. 1, client computers 102, access one or more shared repositories of documents stored on DShare servers (i.e., shared document repositories) 104 for either viewing, storing, or printing, or alternatively receiving recommendations therefor from a KPump server (i.e., recommender system) 106. The client computers 102 are coupled to the DShare servers 104 and KPump server 106 through the network 100. The client computers 102 include a processor with coupled memory 110, a display 112, a pointing device 114, and a keyboard 116.

The client computers 102 simultaneously access the shared document repositories 104 and recommender system 106. Accordingly, each document or collection of documents, including also the result of a search query, accessed from the shared document repositories 104 allow a user immediately view recommendations and also the following options with respect to recommendations: (a) the ability to provide feedback on a document's quality and relevance (i.e., a review); and (b) the possibility to view any review attached to any document or collection.

The terms document or document object as used herein refer to an object which may be a document (i.e., any information object which may be shared by a repository system) or a bulletin board (e.g., a calendar). In addition, those skilled in the art will appreciate that DocuShare® is just one example of a shared document repository 104 and that Knowledge Pump is just one example of a recommender system 106 that may in part provide some of the functionality of the present invention. However, by coupling a shared document repository and recommender system as described below, the following advantages may be realized: (a) users are allowed to simultaneously view data from both systems; (b) users are allowed to rate information on the KPump server under different login alias while with a single DShare login; (c) data reentry between systems is eliminated; (d) data integrity and consistency between the KPump server and DShare server is improved; (e) search results performed at the DShare server are merged with data at the KPump server.

B. Coupled Shared Repository and Recommender

Figure 2:
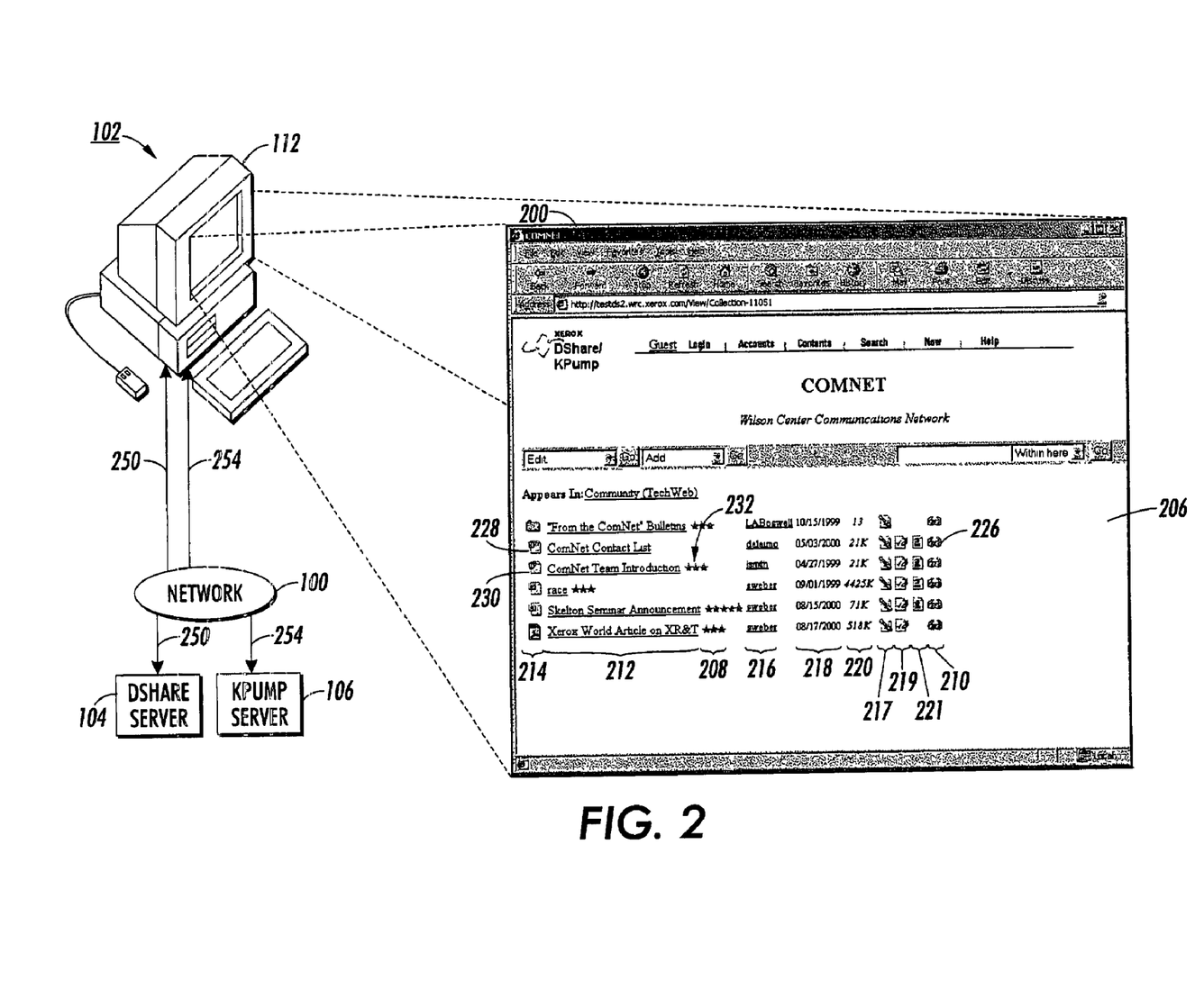
FIG. 2 illustrates an example of a view of a system incorporating shared document repository and recommender functions.

FIG. 2 shows an example of a view of a conventional web browser 200 (e.g., Microsoft® Internet Explorer, Netscape® Navigator, Mozilla, Opera, etc.) user interface incorporating shared document repository functions provided by DShare server 104 and document recommender functions provided by KPump server 106. The DShare server 104 and KPump server 106 are both web-based servers that communicate over network 100 with client computer 102 operating an integrated user interface that is presented on the display 112 as a series of web pages to the conventional web browser 200.

The DShare server and the KPump server 104 and 106 are integrated by extending the user interface (i.e., its generated web pages) of the shared document repository to include results from and provide information to document recommender functions. Thus, the web page displayed when accessing a folder of the DShare server 104, such as folder 206 shown in FIG. 2, includes icons and text which are transmitted by the KPump server 106, and in a similar way, include embedded hyperlinks to KPump services. While some aspects of the folder shown in FIG. 2 have similar functionality to a folder in DocuShare®, additional icons and hyperlinks are shown in FIG. 2 that represent recommender system functions, such as stars 208 and glasses 210 which are described in more detail below.

In operation, a user queries the DShare server 104 using the browser 200 (as illustrated by arrow 250 shown in FIG. 2). In response, the DShare server 104 provides the contents of a document collection (as illustrated by arrow 250 shown in FIG. 2). The document collection represented in the web page 200 with content provided by the DShare server 104 and KPump server 106 includes text and image content. Any of these elements can be associated with a hyperlink, to which the browser 200 will be directed once selected by the user.

As shown in FIG. 2, each document in the folder 206 is identified by a title 212, which is a hyperlink that directs the browser to the document content located on the DShare server 104. Besides the title 212, each document in the folder 206 has document type information (e.g., text document, another folder, image, etc.) 214, author information 216, services command 217, create date information 218, check out command 219, size information 220, and link command 221. The browser 200 receives some image information to be displayed on the web page 200, such as document type 214, in the form of links to images stored at the DShare server 104. In addition, the browser 200 receives other information, such as the recommender content, such as stares 208 and glasses 210, from the KPump server 106 (as illustrated by arrow 254 shown in FIG. 2) due to embedded references in the folder 206.

More specifically, the glasses icons 210 indicate a "review" function and allows the user viewing the folder 206 to review the associated document content listed therein. The user can either review an object (i.e., by selecting appropriate stars 208) or update his/her previously provided review (i.e., by selecting the appropriate glasses icon 210). Each of the glasses icons 210 is associated with a hyperlink, which when selected activates a "review" function of recommender systems. The review function allows a user to provide an opinion of the content of the document associated with the selected glasses, thereby allowing other users the possibility of relying on this opinion before retrieving and reading the document content.

C. Providing Reviews for Objects in the Repository

Figure 3:
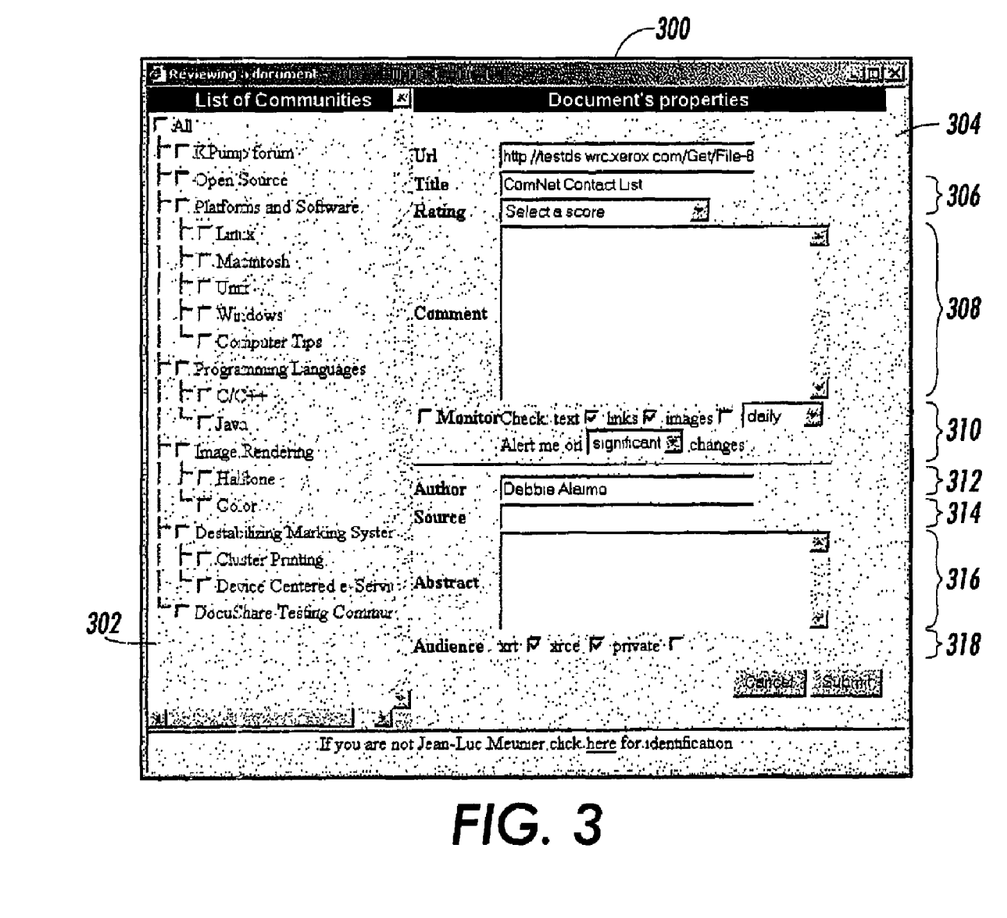
FIG. 3 illustrates an example of a review form for reviewing a document in a shared document repository.

FIG. 3 shows an example of a review form 300 produced by the KPump server 106. The review form 300, which includes windows 302 and 304, is invoked by selecting one of the glasses icons 210 shown in FIG. 2 that is associated with the document title 212 horizontally aligned therewith. The window 302 of the form shows a list of KPump communities, whereas the window 304 shows the properties of the document being reviewed. The document properties that are known to the DShare server 104 are provided as default values in the window 304 of the review form 300.

The document properties forming part of the window 304 are initially passed to the KPump server 106 as parameters of the URLs that are embedded in each object in the DShare web page 200. Advantageously, the KPump server 106 can use embedded document properties such as a document's URL, title and author as default values in the review form 300 to eliminate reproduction of data. For example, the review form in FIG. 3 appears after clicking on the glasses icon 226 of the document object 228 entitled "Comnet Contact List" shown in FIG. 2. More specifically, associated with the glasses icon 226 in the document folder 206, is an HTML tag that may be in the following format:

<a
href="http://KPump/reviewForm?title=ComNet%20 Contact%20List&author=Debbie%20Alaimo&url= . . . ">
<img
src=http://KPump/images/glasses.gif></a>.

As can be seen in the window 304 shown in FIG. 3, a rating field 306 is provided in which the user can provide quality rating of a reviewed document (e.g., the interest a document has to the user and the interest that the document may have to other users in the same community). A comment field 308 is also provided in which specific comments relative to the rating may be provided. A monitor field 310 provides notification to the user of changes to the identified document. An author field 312, which is supplied from information in the DShare server 104, provides the name of the author of the document. In addition, entries are also possible to identify a source of the document in field 314, to provide an abstract of the document in field 316, and to identify an audience for the document (i.e., those user communities outside of the usual KPump communities likely to be interested by the document) in field 318.

D. Viewing Reviews of Objects in the Repository

Referring again to FIG. 2, the star icons 208 that appear to the right of document titles 212 indicate a predicted level of quality of an object of the recommender system (i.e., it indicates the interest of a document to those users who have reviewed it and submitted their review feedback to the system). The stars 208, similar to the glasses 210, are generated by the KPump server 106 and are associated with a hyperlink that opens a window that shows all reviews associated with the selected object.

More specifically, each group of stars 208 provides an overall rating that is associated with a hyperlink that redirects the browser 200 to the KPump server 106 to display reviews corresponding to the overall rating of the document identified by the title 212 horizontally adjacent the stars 208. The overall rating of a document depicted by the stars 208 evaluates a set of specific ratings entered using form 300 shown in FIG. 3. By combining the evaluations from several users, a more precise indication on the relevance of the document may be obtained. Several ways are known for determining the overall relevance of user evaluations or ratings as described in U.S. Pat. Nos. 6,389,372 and 6,321,179, which are hereby incorporated herein by reference.

When a group of stars 208 associated with a document in the folder 206 shown in FIG. 2 is selected, a list of reviews provided by users regarding the related document object is displayed. For example, FIG. 4 illustrates window 400 of a list of reviews that are associated with the document 230 entitled "ComNet Team Introduction" when the stars 232 associated therewith are selected.

Figure 4:
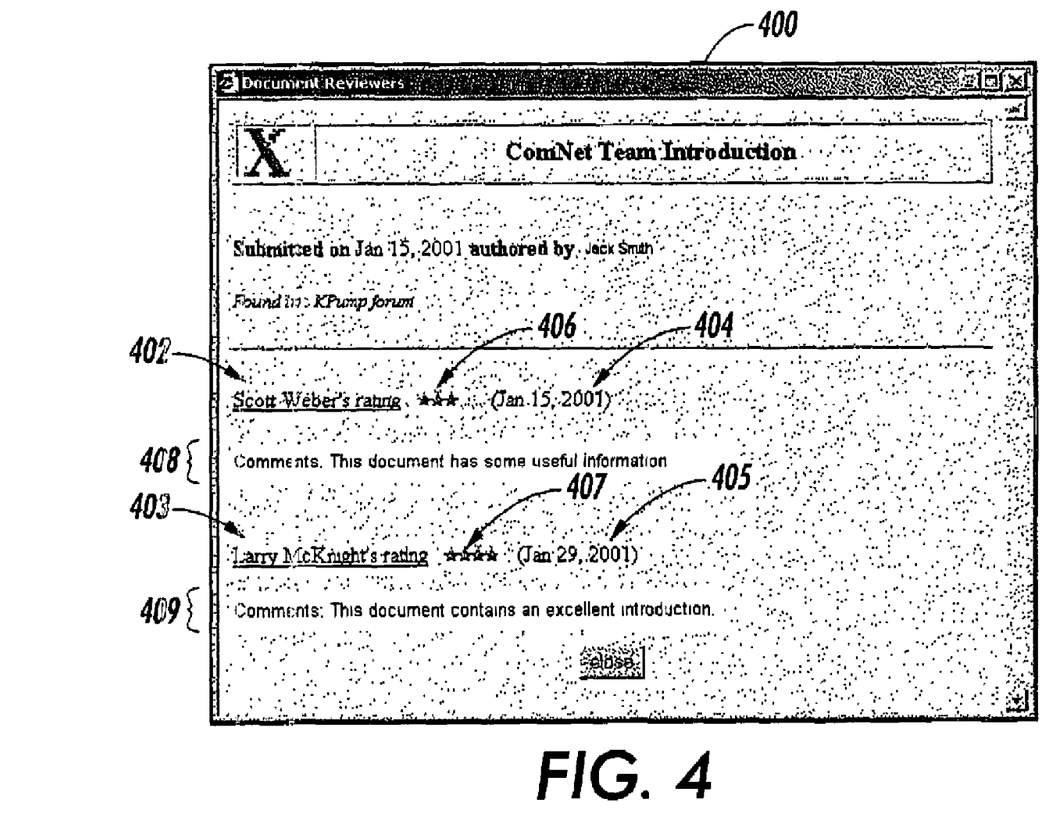
FIG. 4 illustrates an example of a list of reviews on a document stored in a shared document repository.

More specifically, the window 400 in FIG. 4 shows the names of the reviewers 402 and 403, the date reviewed 404 and 405 together with their individual ratings 406 and 407 and comments 408 and 409 for a selected document. Similar to the overall rating 208 for the documents 212 in folder 206 shown in FIG. 2, the individual ratings 408 and 409 shown in the window 400 in FIG. 4 are represented using stars; the more stars, the more valuable a document is rated (i.e., the higher its quality).

As shown in FIG. 4, a first reviewer 402 gave three stars 406, out of a maximum of five, whereas a second reviewer 403 gave four stars 407. It will be appreciated that the maximum number of stars or the manner of presenting the rating may be readily adapted to the preferences and requirements of a particular community. In an alternate embodiment, the number of stars has significance as well as their color. In this alternate embodiment, the color of stars is used to identify the source of its rating.

Generally, in this alternate embodiment there are four possible states that information concerning ratings being displayed may take. A first state occurs when the KPump server 106 has no reviews concerning the document or directory (i.e., object) in the folder 206 (i.e., the object has never been reviewed before). In this state, a blank icon with no stars is displayed as shown in FIG. 2 for the object 228 entitled "ComNet Contact List". If a user tries to select an empty field, which usually contains stars, but where only a blank (i.e., invisible or no color) icon is present, a message indicating that no review has been recorded regarding this document or object will be generated.

A second state occurs when the KPump server 106 contains at least one review of the object that the user who is retrieving the information has reviewed of the object. The stars are shown in a first color (e.g., blue) and their number indicates the user's own rating. In operation in this state, the KPump server 106 must be able to identify the user requesting the review. In one embodiment this is done using cookies, as described in more detail below.

A third state occurs when the KPump server 106 contains some reviews of the object and has identified the user so that it was capable of predicting the user's interest in it. The stars in this state are shown in a second color (e.g., green) and their number indicates the predicted interest for the user, which in the illustrated embodiment is from 0 to 5 stars.

The fourth state occurs when the KPump server 106 contains some reviews of the object but does not have any prediction for the user's interest. The stars are shown in a third color (e.g., dark green) and their number indicates the average rating of all reviews. This non-personalized prediction can be caused by the occurrence of one of the following three different events: (a) the KPump server 106 has not identified the user and therefore cannot deliver a personalized prediction; (b) the KPump server 106 has identified the user but cannot correlate him or her with any of the other users that submitted a review (this event is known as the sparsity problem in the recommender system field); or (c) the KPump server 106 has not yet run through a prediction computation since the document was reviewed for the first time or since the user registered with the KPump server 106. In one embodiment, predictions are computed daily using the contents of both the shared document repository (DShare) and the recommender system (KPump).

More specifically, the stars 208 in a folder 206 are integrated with information from the KPump server 106 in addition to information from the DShare server 104 by using an HTML tag, which may for example be represented as follows:

<a href="http://KPump/showDocumentReviews?-url= . . . "><img src="http://KPump/generateStarIcon?-url= . . . "></a>, where this HTML tag identifies a document or object in the DShare server 104 and the URL of a star generating software module within the KPump server 106. When selected the KPump server receives the document or object identifying information to generate the appropriate summary of reviews as shown in FIG. 4.

E. Indirect Object Identification

As described above, objects are uniquely identified by their full URL in the shared document repository (DShare) coupled to the recommender system (KPump). Each object's URL is encoded by the DShare server 104 and passed on as a URL parameter to the KPump server 106. Thus, each URL associated with a star icon 208 and with a glasses icon 226 is object-dependent (i.e., each appears different depending on information associated with the particular link).

For example, the document 230 entitled "ComNet Team Introduction" shown in FIG. 2 may be identified by the following URL:

http://testds2.wrc.xerox.com/Get/File-55592/IntroCom-Net.doc, where "File-55592" identifies the location in the DShare server 104 of the file "IntroComNet.doc", and where "testds2.wrc.Xerox.com" identifies the DShare server 104 where this document is stored. In an alternative embodiment, an object may be identified by a combination of the DShare handle (i.e., "File-55592") and an identifier of the DShare server (e.g., "Testds2.wrc.Xerox.com"). More information on the use of identifiers in DShare may be found in the U.S. Pat. No. 5,930,801, which is incorporated herein by reference.

Also by way of example, an additional URL is used to provide a link to the list of reviews left by users regarding the document identified by the preceding URL. Unlike the preceding URL which points to the DShare server 104, this URL points to the KPump server 106 as identified by the following URL:

http://KPump/servlets/kp.userInterface.cgi?&Service=External&subService=communityReviewers&-reference=http%3a%2f%2ftestds.wrc.xerox.com%-2fGet%2fFile-55592%2fintroComNet.doc In this example, the URL begins by identifying the recommender system (e.g., "KPump"), followed by a section containing reviews, which terminates with the identification of the document whose reviews are requested (i.e., "IntroComNet.doc").

Accordingly, the KPump server 106 dynamically constructs a folder of the system on the basis of the document identifier that is indirectly passed on by the DShare server 104 as a reference parameter. It is noted that while images like the glasses may be static images, the stars have a dynamic nature (e.g., 0 to 5 stars) as they may change as a function of reviews submitted by users. The parameter that determines the number of stars is the document identifier that is indirectly passed from DShare server to the KPump server via the user's browser, as a parameter of the image reference initially provided by DShare server.

F. User Identification

While the pages generated by the DShare and KPump servers are object-dependent, they are also user-independent to avoid security and organizational problems. However, in order to allow for personalized feedback, as indicated above for example by changing the color of the stars to show the relationship of a review to a user, the system must be capable of identifying users.

User identification is carried out using a method for supplying HTTP (HyperText Transfer Protocol) cookies, in a manner similar to that performed by conventional web browsers. In one embodiment, KPump HTTP cookies are used to identify the user. The cookies that are automatically transmitted by the web browser to the KPump server provide the user's identity. Therefore, the URL referring to KPump resources or services in DShare server can remain user-independent (i.e., free from any information/parameter regarding the user).

Accordingly, the KPump server provides personalized information and service in combination with information from the DShare server, despite a loose coupling. Once a cookie is available, the KPump server can "recognize" a user and provide the personalized information. No further user identification or details are needed.

In one state of the coupled document repository and recommender system, a user logs into the KPump server. However, when a user has not yet logged-in to KPump server, the personalized predictions discussed above remain non-personalized, permitting the ratings only to be based on an internal computation of a weighted average rating embedded in the KPump server. In this state, if a user wants to review a document, a KPump specific login/password window opens. Once the user has logged in, a cookie will thus be stored in the user's system, thereby allowing the user's predictions to become personalized.

Login to the KPump server is performed independent from the login to the DShare server (i.e., whether or not the user is logged-in to DocuShare). However, it is possible to couple the login mechanisms of the KPump and DShare servers so that a user is required only to login once. In one embodiment, a user first logs into the DShare server, and this login information is automatically forwarded to the KPump server, assuming the user's login and password are identical for both systems. To ensure a loose coupling of the two services, this login coupling can be implemented as follows:

In general, the login module of the shared document repository can be modified to function in a similar manner to the link redirect function. More specifically, when a user logs into the DShare server, the user provides a login and password, and then the browser gets redirected to the user's page that was initially requested (or by default for instance to the DShare home page). An extension in the DShare login module allows the login information to be transmitted automatically to KPump. More specifically, the DShare login module validates the login and password information provided by the user, and sets the proper cookies. Additional modifications to the DShare login module make it possible to redirect a user's browser to a KPump URL using well-known HTTP redirection techniques.

The URL parameters thus include the login information as well as the URL of the DShare page initially requested by the user (or the URL of the DShare home page). When KPump receives this information, it validates the login and password (which is the same for KPump) and sets the proper cookies in the user's browser, so that the user can be identified during the active session by KPump whenever requesting its services, and then redirects again the user's browser back to the page the user requested initially, which was passed on as parameter information to KPump.

As such, the login process is not visible to the user, apart from the fact that the user does not need to login to the KPump server separately to benefit from recommender functions such as personalized prediction and document reviews. Because the user's browser has been silently redirected to the KPump server, the KPump server has the opportunity to validate the login and password and set the proper cookies if necessary.

G. Additional Considerations

Although the above implementation has been mainly described in view of DShare and KPump servers, the design principle of integrating a shared document repository with a recommender system can be applied to any web-based shared document repository or recommender system. Similarly, the form in which to present reviews are described above is merely illustrative of one manner for representing a rating and may be adapted according to personal preferences.

In order to couple a web-based shared document repository and recommender system, the shared document repository should satisfy the following four requirements;

(a) The shared document repository should allow for customization of the page that displays a document collection and/or document attributes. This customizability permits the adding of new functions/services in the form of hyperlinks associated with added text or picture (b) The customization mechanism should allow for dynamic object introspection so that a hyperlink can be specifically constructed on the fly for each document or collection. As such, at least the URL of the object (document) must be available, preferably also the object title, author and abstract when applicable.

(c) The document and collection URLs need to be user- and time-independent, to the extent of the object lifetime itself.

(d) The login procedure should be adapted to unify the login information between two independently operating systems.

In addition, the design principle of integrating a shared document repository with a recommender system can be applied to any typical web-based recommender system that satisfies the following requirements:

(a) It should be possible to determine the URL permitting the review of a web resource (URL), possibly providing also relevant metadata (title, type, create date, etc.).

(b) It should be possible to determine that URL which provides a relevance prediction regarding a web resource identified by its URL. The prediction can be textual and/or graphical.

(c) It should be possible to determine the URL providing the detailed feedback left by users regarding a web resource identified by its URL is needed.

(d) All the URLs in the requirements (a)–(c) above should be user-independent (i.e., users are not explicitly identified) but rather by other means, possibly using cookies. Alternatively, URLs in the requirements (a)–(c) above can be replaced by any unique identifier of a DShare object by using, for example, the identifier of the shared document repository.

Figure 5:
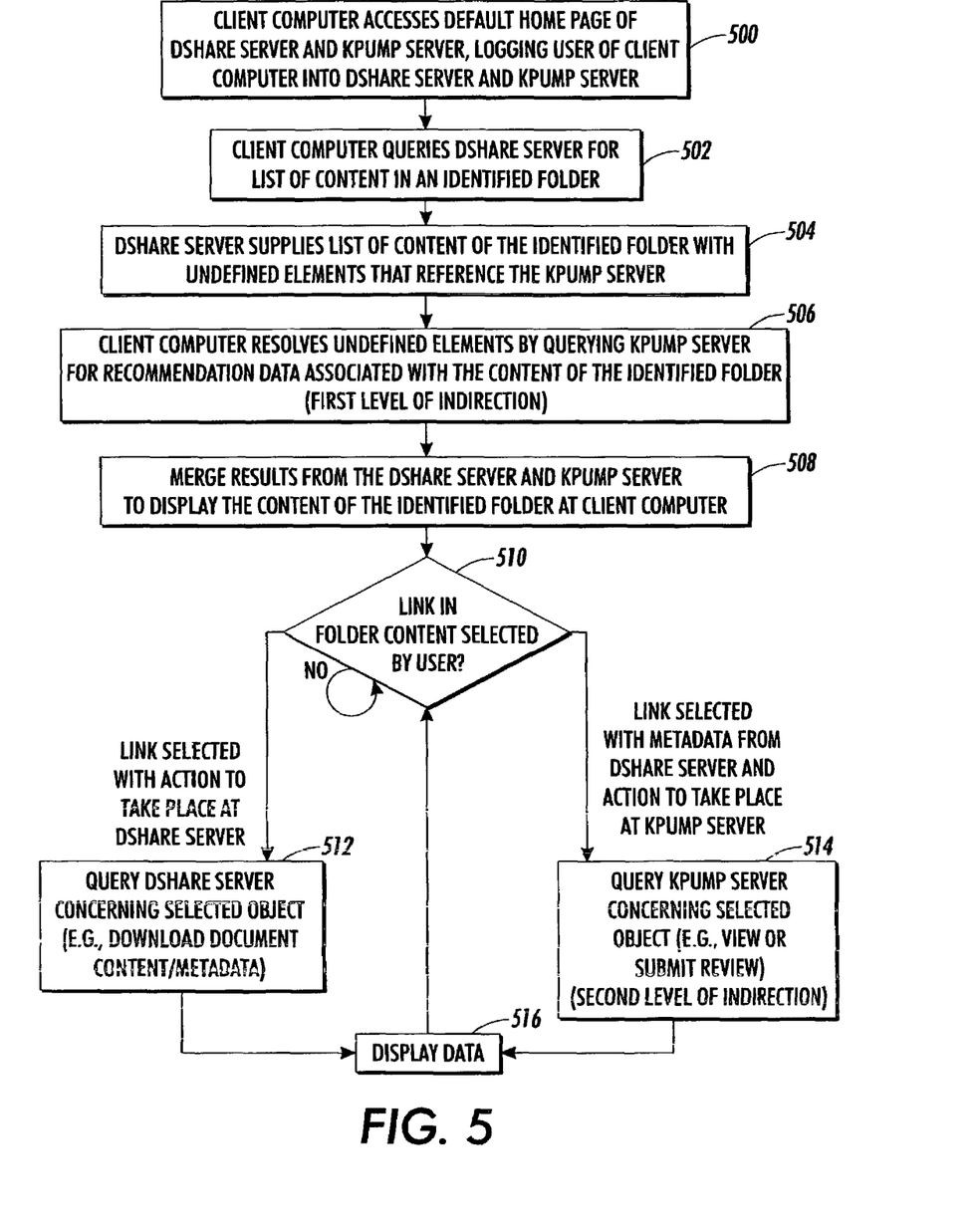
FIG. 5 is a flow diagram setting forth the actions performed when accessing the system incorporating shared document repository and recommender functions.

FIG. 5 illustrates a flow diagram setting forth the actions performed at the client computer 500 in one embodiment when accessing the DShare server 104 incorporating shared document repository and and the KPump server 106 incorporating recommender functions. Initially at 500, the client computer 102 accesses a default home page of the DShare and/or KPump servers, logging the user into the servers automatically in the manner set forth above if the appropriate user information is recorded at the client computer.

At 502, the client computer queries the DShare server 104 for a list of content in an identified folder (i.e., container) of the shared document repository. The identified folder being specified manually by the user or as a result of a search performed by the user of the content of the shared document repository.

At 504, the DShare server 104 responds the query at 502 with a list of the content of the identified folder with undefined elements that reference the KPump server 106. Some of these undefined elements that reference (i.e., reference parameters) the KPump server, using for example a URL, include data provided by the DShare server.

At 506, the client computer resolves the undefined elements by querying the KPump server for recommendation data associated with the content of the identified folder. This action provides a first level of indirection by transparently coalescing information regarding the contents of a shared directory and information concerning the recommendations (i.e., valuations) of the content in the selected folder.

At 508, the client computer merges the results received from the DShare server and the KPump server to dynamically construct the content of the identified folder at the browser 200 (as shown in FIG. 2). At 510, the client computer waits for a user selection to take place at the browser 200 displaying the contents of the identified folder, until such time as the user terminates the session of the browser.

At 512, a selection takes place (e.g., a link) in the browser 200 which causes an action to take place at the DShare server. The client computer queries the DShare server concerning the selected object, which may be a document or metadata related to the document.

At 514, a link is selected in the browser 200 which is associated with metadata from the DShare server and an action to take place at the KPump server (i.e., with a function provided by the KPump server). This begins a second level of indirection by associating recommendations (submissions or reviews of the content in the selected folder) with data partly specified from data provided by the DShare server.

At 516, once information is received from either the DShare server and/or KPump server, the client computer displays the information in a separate (or the same) browser session. Subsequently, the determination at 510 is repeated until the session terminates.

H. Miscellaneous

It will be appreciated that the above-described coupling of a recommender system with a shared document repository has the following advantages: data that is used in one system need not be reentered in the other system (e.g., reviews from the KPump server are supplemented with metadata from the DShare server); users benefit from, possibly personalized, recommendations while they are browsing though a shared document repository; and a search of the document collection is enriched with additional information from the recommender system.

One implementation of such an enhanced shared document repository can be obtained by adapting an existing shared document repository and recommender system to operate together as described above. Software programs for implementing such a system can run on one or more generally known computer-based systems.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A system operating on a network, comprising:

a shared document repository coupled to the network, the shared document repository providing shared access to document objects stored therein;

a recommender system coupled to the network, the recommender system providing at least one of a user valuation and a user recommendation for identified document objects; and a client computer coupled to the network and communicating with the shared document repository and the recommender system over the network, the client computer coupling functions of the shared document repository and the recommender system over a network;

wherein the client computer queries data from the shared document repository and the recommender system, the data received from the shared document repository including an element providing a link that references a function at the recommender system, wherein the link to the recommender system providing access to at least one of viewing and submitting the at least one of the user evaluation or the user recommendation for the document objects in the shared document repository, the link including parameter data that is specified with metadata of the document objects provided by the shared document repository, and wherein the client computer merges the data queried from the shared document repository and the recommender system to define a user interface to provide a list of the document objects in the shared document repository and the at least one of the user evaluation and the user recommendation from the recommender system.

2. The system according to claim 1, wherein the user interface is represented using a series of web pages that are viewed in a browser.

3. The system according to claim 2, further comprising:
   first objects displayed on the user interface that once selected initiate retrieval of documents, to the client computer, that are uniquely identified by the document objects in the shared document repository; and
   second objects displayed on the user interface that once selected initiate retrieval of the user recommendations of documents, to the client computer, that are stored at the recommender system.

4. The system according to claim 2, further comprising:
   first objects displayed on the user interface that once selected initiate retrieval of documents, to the client computer, that are uniquely identified by the document objects in the shared document repository; and
   second objects displayed on the user interface that once selected initiate submission of recommendations of documents, from the client computer, that are stored at the recommender system.

5. A method for integrating over a network functions of a recommender system into a shared document repository, the shared document repository allowing users to share documents using a browser that operates as part of a user interface of a client computer, the method comprising:
   querying the shared document repository with the browser for displaying document objects stored therein;
   receiving data from the shared document repository concerning the document objects together with a plurality of hyperlinks associated therewith, at least a first one of the hyperlinks activating a function in the recommender system and a second one of the hyperlinks activating a function in the shared document repository;
   displaying in the browser the document objects and one or more icons related to each document object;
   receiving input indicating selection of one of the one or more icons;
   directing the browser to a link to the recommender system associated with the selected icon, wherein the link to the recommender system provides access to at least one of viewing and submitting at least one of a user evaluation and a user recommendation for the document objects in the shared document repository, the link including parameter data that is specified using metadata of the document objects provided by the shared document repository;
   activating a function of the recommender system identified by the hyperlink, the function being activated at the recommender system with the parameter data; and
   merging the data received from the shared document repository with a resource provided by the activated function to display in the browser the document objects, the one or more icons and the at least one of the user evaluation and the user recommendation.

6. The method according to claim 5, wherein selection of a first icon of the one or more icons invokes a review function of the recommender system, the review function displaying in the browser a review form that allows input of comments on a document object in the shared document repository that is related to the first icon.

7. The method according to claim 6, wherein selection of a second icon of the one or more icons invokes access to a review database of the recommender system, the review database containing reviews of documents stored in the shared document repository, the method further comprising:
   selecting the second icon;
   identifying a document object related to the selected second icon; searching reviews of the identified document in the review database; and
   displaying in the browser reviews found for the shared document related to the selected second icon.

8. The method according to claim 7, wherein the second icon indicates a predicted level of quality of the identified document.

9. The method according to claim 8, wherein the recommender system provides personalized prediction with information identifying a user stored at the client computer.

10. The method according to claim 9, wherein the recommender system uses user-access limitations and identifies a user by a login access with a URL having an access function for generating a login screen.

11. The method according to claim 10, wherein the shared document repository uses user-access limitations and identifies a user by a login access.

12. The method according to claim 11, wherein similar login access information is used for the shared document repository and the recommender system.

13. A method for dynamically coalescing at a client computer, functions of a recommender system with documents stored in a shared document repository, comprising:
   querying with the client computer the shared document repository for a list of objects in a folder of the shared document repository;
   receiving at the client computer from the shared document repository the list of the objects in the folder of the shared document repository;
   providing from the recommender system at least one of a user evaluation and a user recommendation for the object in the folder of the shared document repository;
   providing an access by the client computer to a function of the recommender system with parameter data associated with the list of objects in the folder of the shared document repository, the function being identified by the shared document repository and the parameter data being provided by the shared document repository, the function providing access to at least one of viewing and submitting the at least one of the user evaluation and the user recommendation the objects in the folder;
   merging at the client computer results received from the recommender system and the shared document repository in a user interface of the client computer, the merged results providing the list of the objects in the folder of the shared document repository with the at least one of the user evaluation and the user recommendation received from the recommender system.

14. The method according to claim 13, further comprising:
   receiving an input indicating selection of one of the objects in the merged results displayed in the user interface of the client computer, the objects being associated with at least one of the shared document server and the recommender system; and
   at least one of objects accessing the shared document server to retrieve data associated with the selected one object;
   and accessing the recommender system with metadata associated with the object provided by the shared document server to retrieve recommendations associated with the selected one object.

15. The method according to claim 14, wherein the data associated with the selected one object is one of document content and document metadata provided by the shared document server.

16. The method according to claim 13, further comprising:
  receiving input indicating selection of an object in the merged results displayed in the user interface of the client computer, the object being associated with at least one of the shared document server and the recommender system; and
  at least one of accessing the shared document server to retrieve data associated with the selected one object and submitting to the recommender system with metadata associated with the object provided by the shared document server recommendations associated with the selected one object.

17. The method according to claim 16, wherein the data associated with the selected one object is one of document content and document metadata provided by the shared document server.

* * * * *